SELF-ORIENTING RADIO DIRECTION FINDERS

Filed June 24, 1955

United States Patent Office 2,836,817

Patented May 27, 1958

2,836,817

SELF-ORIENTING RADIO DIRECTION FINDERS

Dennis Byatt, Chelmsford, and James Frederick Hatch, Hutton, England, assignors to Marconi's Wireless Telegraph Company Limited, London, England, a British company Application June 24, 1955, Serial No. 517,844

Claims priority, application Great Britain July 19, 1954

5 Claims. (Cl. 343—117)

Figures 1, 2:
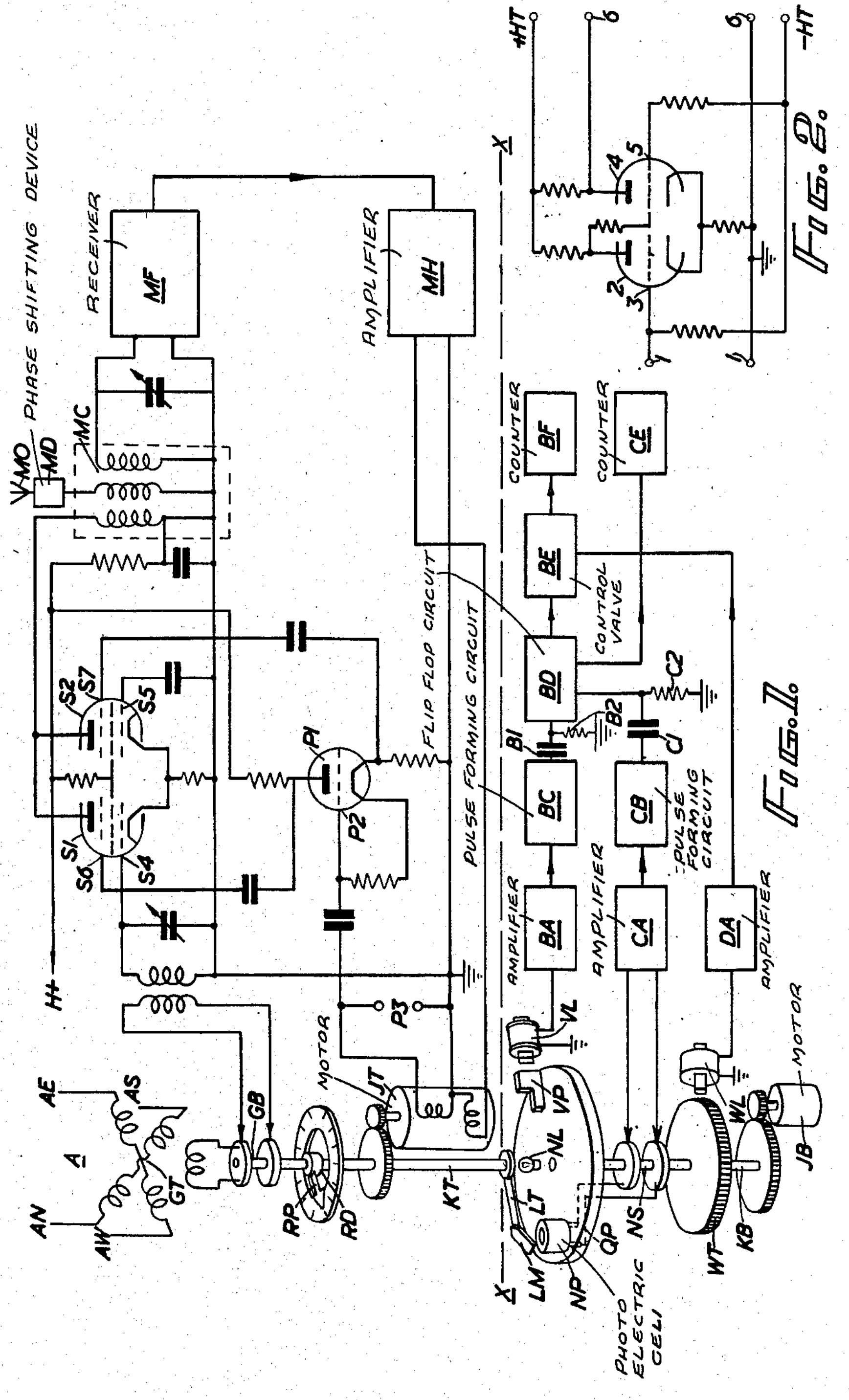

This invention relates to self-orienting radio direction finders, that is to say to radio direction finders which automatically orient themselves on an incoming signal. Numerous forms of such direction finders are known but owing mainly to ionospheric effects upon high frequency waves, the bearing indications they give have a marked tendency to fluctuate even when receiving uninterrupted signals. Accordingly an instantaneous reading of the pointer of the member whose orientation is automatically controlled in dependence upon incoming signal direction is liable to error and the error, moveover, is random, since it depends upon the extent of wave interference and deviation going on and the position which this has caused the pointer to take up at the moment it is observed. If the incoming signals are interrupted e. g. if they are Morse or similar code signals, directional readings taken in this, the usual way, are very liable to error; indeed many known forms of self-orienting direction finders are virtually useless for interrupted or short duration signals.

The present invention seeks to avoid the foregoing defects and disadvantages and provide improved self-orienting radio direction finders which, though of normal design and construction so far as the radio frequency part of the apparatus is concerned, are largely free of errors of reading due to fluctuation (even though fluctuation may still occur) and will give accurate indications of bearing of interrupted as well as of uninterrupted incoming signals.

According to this invention a self-orienting radio direction finder having a member whose position is automatically controlled in dependence upon incoming signal direction comprises means for repeatedly producing a series of pulses of number dependent upon the position of said member in relation to a fixed member, means for counting the total count of said pulses over a number of repetitions and means for counting the number of repetitions.

Preferably the means for repeatedly producing the series of pulses comprises a continuously running pulse generator, a rotary member, means for generating a first control signal when said rotary member passes a predetermined fixed point in its rotation, and means for generating another control signal when said rotary member passes a variable point in its rotation, means being provided for varying said latter point in dependence upon the position of the automatically controlled member, the pulses occurring between the two control signals being counted by one counter and the number of first control signals being counted by the other.

The continuously running pulse generator may conveniently be a phonic wheel generator and the rotary member may conveniently carry one part of an inductor generator whose other part is fixed and produces the first control signal once per revolution of said rotary member, said rotary member also carrying a means for generating the other control signal each time said means passes the automatically controlled member. The first control signal may be used to open and the other control signal to close a gate in a channel leading from the phonic wheel to the pulse counter fed thereby.

The invention is illustrated in the accompanying schematic and diagrammatic drawings in which Fig. 1 shows one embodiment and Fig. 2 is a detail thereof.

Referring to Fig. 1 the circuits and apparatus above the line X—X are a conventional self orientating direction finding system, well known to those skilled in the art, comprising a directional aerial, goniometer and closed loop control servo-mechanism, operating in the following manner:

The transmitted radio waves are received by a direction conscious aerial system A, comprising mutually perpendicular pairs of aerials AN, AS, and AE, AW arranged in the usual way at the corners of a square and connected to the stator windings of a goniometer GT the rotor of which is mechanically coupled to the shaft KT. The output of said rotor is fed via slip ring and brush assembly GB to the control grids S5 and S4 of cathode coupled valves S1 and S2 respectively. A phase-splitter valve P1 applies equal signals, for example at 300 C./S., obtained from a source connected at terminals P3, in antiphase to the supressor grids S6 and S7 respectively of the said valves S1 and S2.

The outputs from valves S1 and S2 are combined in transformer MC with the signal received by an omnidirectional sense aerial MO, which supplies its signals via a phase shifting device MD provided for adjustment purposes. The resultant is applied to an ordinary receiver MF comprising the usual radio frequency, intermediate frequency and detector followed by a 300 C./S. amplifier MH. The 300 C./S. signal appearing at the output of the amplified will, of course, have an amplitude which is a function of the direction of the incoming radio waves received by the aerial system because the polar diagram of the aerial system is a "figure of eight." This output is fed to one phase of a two phase induction motor JT, the other phase of which is connected to the constant 300 C./S. source at terminals P3.

The rotor of induction motor JT is mechanically coupled through a reduction gear to the shaft KT. Accordingly the motor JT will rotate until the signal amplitude from the goniometer has decreased to zero, and will then stop. If the goniometer overshoots this null position the amplitude of the radio signal from the goniometer will begin the increase, but it will be in opposite phase to the original signal, and will therefore cause the motor JT to drive in the opposite direction back to the true null direction. A pointer RP attached to the shaft KT moves over a scale RD to indicate this null position, which is the true incoming signal direction.

In practice, and due to fluctuations as already described, the pointer RP does not give a steady reading of bearing but tends to oscillate about the correct reading and accordingly often fails to give reasonably accurate bearing indications of the direction of the transmitter whose signals are being received. The present invention avoids these defects by providing simple and efficient means for averaging the readings of bearing without interfering in any way with the apparatus which operates the pointer.

The apparatus and circuits shown below the line X—X are provided in accordance with this invention. On the pointer shaft KT is an arm LT carrying an inclined mirror LM positioned to reflect light from a lamp NL in the axis of the shaft in a direction parallel to the shaft axis. Below the mirror is a plate QP carrying a photo-electric cell NP the plate being rotatable about the shaft axis and the cell being at the same radial distance from the axis as the mirror so that when the cell is directly below the mirror it receives light therefrom. The photo-electric cell is connected to slip rings NS on a shaft KB on which the plate QP is mounted.

The plate QP also carries a magnetic pole piece VP in a pre-determined position and arranged when the plate rotates, to pass near an iron cored inductor VL to induce an impulse therein once per revolution of the plate. This impulse is and will hereinafter be referred to as a datum impulse. The shaft KB is rotated through a reduction gear by a motor JB at a speed, for example, of one revolution every 0.72 sec. Also mounted on shaft KB is a toothed phonic wheel WT, well known per se, which, as the shaft rotates, generates a suitable output frequency. If, with the shaft rotating at 0.72 sec. per revolution, there are 360 teeth in the phonic wheel the output frequency will be 500 C./S. and each cycle thereof will be equivalent to 1° of rotation of the shaft KB.

The datum pulses from inductor VL occurring once every revolution of plate QP are fed via an amplifier BA to a pulse forming circuit BC which may conveniently be a Schmidt trigger circuit as shown in Fig. 2. The said pulses appearing at the input terminals 1 (Fig. 2) drive the grid 3 of valve 2 positive thereby increasing the anode current through said valve 2 decreasing the potential at grid 5 of valve 4 and producing positive going rectangular pulses at the output terminals 6. These rectangular pulses are fed to a differentiator circuit consisting of capacitor B1 and resistor B2 (Fig. 1) producing sharply peaked pulses which are applied to a so-called "flip-flop" circuit BD.

The electrical impulses from photo-electric cell NP are amplified by an amplifier CA, and after passing through a pulse forming circuit CB, similar to the circuit BC, are differentiated by a circuit consisting of capacitor C1 and resistor C2 and also applied as sharp peaked pulses to the "flip-flop" circuit BD. This "flip-flop" circuit is a duo-stable arrangement having two stable states of equilibrium and which is arranged and connected in manner well known so that, when it receives a pulse from the differentiator B1, B2 it changes over from one state to the other and when it receives a pulse from the differentiator C1, C2 it changes back again. The output from the "flip-flop" BD is applied in well known way to control the conductivity of a valve at BE which is rendered conductive when one stable state is set up and nonconductive when the other exists.

The alternating signal from inductor WL is amplified in an amplifier DA and fed to the valve at BE. The valve output will thus consist of bursts of alternating electrical energy of frequency equal to that of the signal generated by the phonic wheel WT, each burst commencing at that instant when inductor VL emits a pulse and ceasing at the instant when inductor WL emits a pulse. Therefore the number of cycles of phonic wheel frequency in each burst is a measure of the instantaneous deflection of the pointer RF with reference to a datum line determined by the instant of generation of the datum pulse. This output is fed to a counter BF, preferably an electronic counter, such as a so-called "Dekatron" which counts the total number of pulses passed thereto. Output from the "flip-flop" circuit BD is also fed to another similar counter CE, similar to BF, which thus counts the number of "samples" taken of the position of the deflection of pointer RP. Accordingly division of the count registered by counter BF, by that registered by counter CE, will give the average position of the pointer RP. If desired any means known per se but not shown may be provided for resetting the counters and again, if desired, any known computing device (not shown) may be provided for indicating directly the quotient obtained by dividing one count by the other.

We claim:

1. A self-orienting radio direction finder having a member whose position is automatically controlled in dependence upon incoming signal direction comprising means for repeatedly producing a series of pulses of number dependent upon the position of said member in relation to a fixed member, means for counting the total count of said pulses over a number of repetitions and means for counting the number of repetitions.

2. A direction finder as set forth in claim 1 wherein the means for repeatedly producing the series of pulses comprises a continuously running pulse generator, a rotary member, means for generating a first control signal when said rotary member passes a pre-determined fixed point in its rotation, and means for generating another control signal when said rotary member passes a variable point in its rotation, means being provided for varying said latter point in dependence upon the position of the automatically controlled member, and two counters being provided, one connected to count the pulses occurring between the two control signals and the other being connected to count the number of first control signals.

3. A direction finder as set forth in claim 1 wherein the means for repeatedly producing the series of pulses comprises a continuously running pulse generator, a rotary member, means for generating a first control signal when said rotary member passes a predetermined fixed point in its rotation, and means for generating another control signal when said rotary member passes a variable point in its rotation, means being provided for varying said latter point in dependence upon the position of the automatically controlled member, and two counters being provided, one connected to count the pulses occurring between the two control signals and the other being connected to count the number of first control signals, said continuously running pulse generator comprising a phonic wheel generator said rotary member carrying one part of an inductor generator whose other part is fixed and producing the first control signal once per revolution of said rotary member, said rotary member also carrying a means for generating the other control signal each time said means passes the automatically controlled member.

4. A direction finder as set forth in claim 1 wherein the means for repeatedly producing the series of pulses comprises a continuously running pulse generator, a rotary member, means for generating a first control signal when said rotary member passes a predetermined fixed point in its rotation, and means for generating another control signal when said rotary member passes a variable point in its rotation, means being provided for varying said latter point in dependence upon the position of the automatically controlled member, and two counters being provided, one connected to count the pulses occurring between the two control signals and the other being connected to count the number of first control signals, said first control signal operating to open and the other control signal operating to close a gate in a channel leading from the phonic wheel to the pulse counter fed thereby.

5. A self-orienting radio direction finder comprising a member whose position is automatically controlled in dependence upon incoming signal direction, a continuously driven rotary member, means for generating a datum signal once per revolution of said rotary member, co-operating signal generating means driven one by said automatically controlled member and the other by said rotary member and adapted to produce a direction signal each time said one and other co-operation signal generating means are in a predetermined relative position, an alternating current generator drives with said rotary member, means for producing a pulse from each datum signal, means for producing a pulse from each direction signal, a gate valve, means jointly controlled by the pulses derived from the datum and directional signals for opening said gate valve during intervals between each datum and direction signals, means for applying the alternating current output from said generator to said gate valve, a counter fed with output from the gate valve and a second counter connected to count the number of times the gate valve is opened.

References Cited in the file of this patent

UNITED STATES PATENTS 2,730,716 Granqvist ---------------- Jan. 10, 1956